(12) United States Patent
Bunea et al.

(10) Patent No.: US 11,661,745 B2
(45) Date of Patent: May 30, 2023

(54) ROOFING SHINGLES WITH HANDLES

(71) Applicant: GAF Energy LLC, Parsippany, NJ (US)

(72) Inventors: Gabriela Bunea, San Jose, CA (US); Thierry Nguyen, San Francisco, CA (US); Michael Kuiper, Newark, CA (US); Evan Wray, Cotati, CA (US); Brian West, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/965,482

(22) Filed: Oct. 13, 2022

(65) Prior Publication Data
US 2023/0036656 A1    Feb. 2, 2023

Related U.S. Application Data

(63) Continuation of application No. 17/524,515, filed on Nov. 11, 2021, now Pat. No. 11,486,144.

(60) Provisional application No. 63/122,025, filed on Dec. 7, 2020, provisional application No. 63/113,072, filed on Nov. 12, 2020.

(51) Int. Cl.
| | | |
|---|---|---|
| *E04D 1/28* | (2006.01) | |
| *H02S 20/25* | (2014.01) | |
| *E04D 1/00* | (2006.01) | |
| *E04D 1/30* | (2006.01) | |
| *B31B 50/86* | (2017.01) | |
| *B31B 70/86* | (2017.01) | |

(52) U.S. Cl.
CPC ............. *E04D 1/28* (2013.01); *E04D 1/2918* (2019.08); *E04D 1/30* (2013.01); *H02S 20/25* (2014.12); *B31B 50/86* (2017.08); *B31B 70/86* (2017.08)

(58) Field of Classification Search
CPC ........... E04D 1/28; E04D 1/2918; E04D 1/30; H02S 20/25; B31B 50/86; B31B 70/86
See application file for complete search history.

(56) References Cited

U.S. PATENT DOCUMENTS

| | | |
|---|---|---|
| 1,981,467 A | 11/1934 | Radtke |
| 1,981,647 A | 11/1934 | Johnson |
| 3,156,497 A | 11/1964 | Lessard |
| 4,258,948 A | 3/1981 | Hoffmann |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 «sunflaresolar.com/news/sunflare-develops-prototype-for-new-residential-solar-shingles» retrieved Feb. 2, 2021.

(Continued)

*Primary Examiner* — Adriana Figueroa
(74) *Attorney, Agent, or Firm* — Greenberg Traurig, LLP

(57) ABSTRACT

A roofing shingle includes a head lap and at least one solar cell. The head lap includes at least one handle located between a first end and a second end of the shingle and proximate to a first edge thereof. The at least one handle includes at least one cutout and a gripping portion. The at least one cutout is sized and shaped to receive an external object to facilitate transporting the shingle by a user.

20 Claims, 8 Drawing Sheets

(56) References Cited

U.S. PATENT DOCUMENTS

| | | |
|---|---|---|
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,462,221 A | 10/1995 | Zink |
| 5,467,915 A | 11/1995 | Mattson |
| 5,590,495 A | 1/1997 | Bressler et al. |
| 5,642,596 A | 7/1997 | Waddington |
| 6,008,450 A | 12/1999 | Ohtsuka et al. |
| 6,046,399 A | 4/2000 | Kapner |
| 6,320,114 B1 | 11/2001 | Kuechler |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,666,491 B2 | 2/2010 | Yang et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,413,809 B2 | 4/2013 | Koch et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,623,499 B2 | 1/2014 | Viasnoff |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,853,520 B2 | 10/2014 | Ueda et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,145,498 B2 | 9/2015 | Ultsch |
| 9,117,991 B1 | 10/2015 | Pearce |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,528,270 B2 | 12/2016 | Jenkins et al. |
| 9,605,432 B1 | 3/2017 | Robbins |
| 9,670,353 B2 | 6/2017 | Peng et al. |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,920,515 B2 | 3/2018 | Xing et al. |
| 9,923,515 B2 | 3/2018 | Rodrigues et al. |
| 9,938,729 B2 | 4/2018 | Coon |
| 9,987,786 B2 | 6/2018 | Stoiljkovic et al. |
| 9,991,412 B2 | 6/2018 | Gonzalez et al. |
| 9,998,067 B2 | 6/2018 | Kalkanoglu et al. |
| 10,015,933 B2 | 7/2018 | Boldrin |
| 10,027,273 B2 | 7/2018 | West et al. |
| 10,115,850 B2 | 10/2018 | Rodrigues et al. |
| 10,128,660 B1 | 11/2018 | Apte et al. |
| 10,179,852 B2 | 1/2019 | Gossi et al. |
| 10,187,005 B2 | 1/2019 | Rodrigues et al. |
| 10,256,765 B2 | 4/2019 | Rodrigues et al. |
| 10,454,408 B2 | 10/2019 | Livsey et al. |
| 10,480,192 B2 | 11/2019 | Xing et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,669,414 B2 | 6/2020 | Li et al. |
| 10,784,813 B2 | 9/2020 | Kalkanoglu et al. |
| D904,289 S | 12/2020 | Lance et al. |
| 10,907,355 B2 | 2/2021 | Hubbard et al. |
| 10,914,063 B2 | 2/2021 | Lee et al. |
| RE48,555 E | 5/2021 | Cancio et al. |
| 11,012,026 B2 | 5/2021 | Kalkanoglu et al. |
| 11,015,085 B2 | 5/2021 | Bruns et al. |
| 11,065,849 B2 | 7/2021 | Ackermann et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,424,379 B2 | 8/2022 | Sharenko et al. |
| 11,431,281 B2 | 8/2022 | Perkins et al. |
| 2002/0053360 A1 | 5/2002 | Kinoshita et al. |
| 2002/0102422 A1 | 8/2002 | Hubbard et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2005/0115603 A1 | 6/2005 | Yoshida et al. |
| 2005/0144487 A1 | 7/2005 | Dinwoodie |
| 2005/0144870 A1 | 7/2005 | Dinwoodie |
| 2006/0042683 A1 | 3/2006 | Gangemi |
| 2006/0046084 A1 | 3/2006 | Yang et al. |
| 2007/0181174 A1 | 8/2007 | Ressler |
| 2007/0193618 A1 | 8/2007 | Bressler et al. |
| 2007/0249194 A1 | 10/2007 | Liao |
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0271774 A1 | 11/2008 | Kalkanoglu et al. |

(56) References Cited

U.S. PATENT DOCUMENTS

| | | |
|---|---|---|
| 2009/0000222 A1 | 1/2009 | Kalkanoglu et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2010/0019580 A1 | 1/2010 | Croft et al. |
| 2010/0101634 A1 | 4/2010 | Frank et al. |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0313499 A1 | 12/2010 | Gangemi |
| 2010/0325976 A1 | 12/2010 | Degenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0239555 A1 | 10/2011 | Cook et al. |
| 2011/0302859 A1 | 12/2011 | Crasnianski |
| 2012/0060902 A1 | 3/2012 | Drake |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2013/0008499 A1 | 1/2013 | Verger et al. |
| 2013/0014455 A1 | 1/2013 | Grieco |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0254776 A1 | 9/2014 | O'Connor et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0024159 A1 | 1/2015 | Bess et al. |
| 2015/0089895 A1 | 4/2015 | Leitch |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179726 A1 | 6/2017 | Garrity et al. |
| 2017/0203555 A1 | 7/2017 | Wang et al. |
| 2017/0237390 A1 | 8/2017 | Hudson et al. |
| 2017/0248344 A1 | 8/2017 | Kauffmann et al. |
| 2017/0331415 A1 | 11/2017 | Koppi et al. |
| 2018/0057217 A1 | 3/2018 | Veder |
| 2018/0094438 A1 | 4/2018 | Wu et al. |
| 2018/0094439 A1 | 4/2018 | Wang et al. |
| 2018/0097472 A1 | 4/2018 | Anderson et al. |
| 2018/0198404 A1 | 7/2018 | Lopez et al. |
| 2018/0219512 A1 | 8/2018 | Langmaid et al. |
| 2018/0281347 A1 | 10/2018 | Gossi |
| 2018/0351502 A1 | 12/2018 | Almy et al. |
| 2019/0030867 A1 | 1/2019 | Sun et al. |
| 2019/0081436 A1 | 3/2019 | Onodi et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0002898 A1 | 1/2021 | Knebel et al. |
| 2021/0095474 A1 | 4/2021 | Yang et al. |
| 2021/0113970 A1 | 4/2021 | Stainer et al. |
| 2021/0115223 A1 | 4/2021 | Bonekamp et al. |
| 2021/0159353 A1 | 5/2021 | Li et al. |
| 2021/0171808 A1 | 6/2021 | Ackermann et al. |
| 2021/0172174 A1 | 6/2021 | Ackermann et al. |

FOREIGN PATENT DOCUMENTS

| | | |
|---|---|---|
| CN | 202797032 U | 3/2013 |
| DE | 1958248 A1 | 11/1971 |
| EP | 1837162 A1 | 9/2007 |
| EP | 1774372 A1 | 7/2011 |
| EP | 2784241 A1 | 10/2014 |
| JP | 06-082294 U | 11/1994 |
| JP | 2001-098703 A | 10/2002 |
| JP | 2016-142079 A | 8/2016 |
| JP | 2017-027735 A | 2/2017 |
| WO | 2011/049944 A1 | 4/2011 |
| WO | 2015/133632 A1 | 9/2015 |
| WO | 2019/201416 A1 | 10/2019 |

OTHER PUBLICATIONS

RGS Energy, 3.5kW POWERHOUSE 3.0 system installed in an afternoon; Jun. 7, 2019 «facebook.com/RGSEnergy/» retrieved Feb. 2, 2021.

Tesla, Solar Roof «tesla.com/solarroof» retrieved Feb. 2, 2021.

"Types of Roofing Underlayment", Owens Corning Roofing; «https://www.owenscorning.com/en-us/roofing/tools/how-roofing-underlayment-helps-protect-your-home» retrieved Nov. 1, 2021.

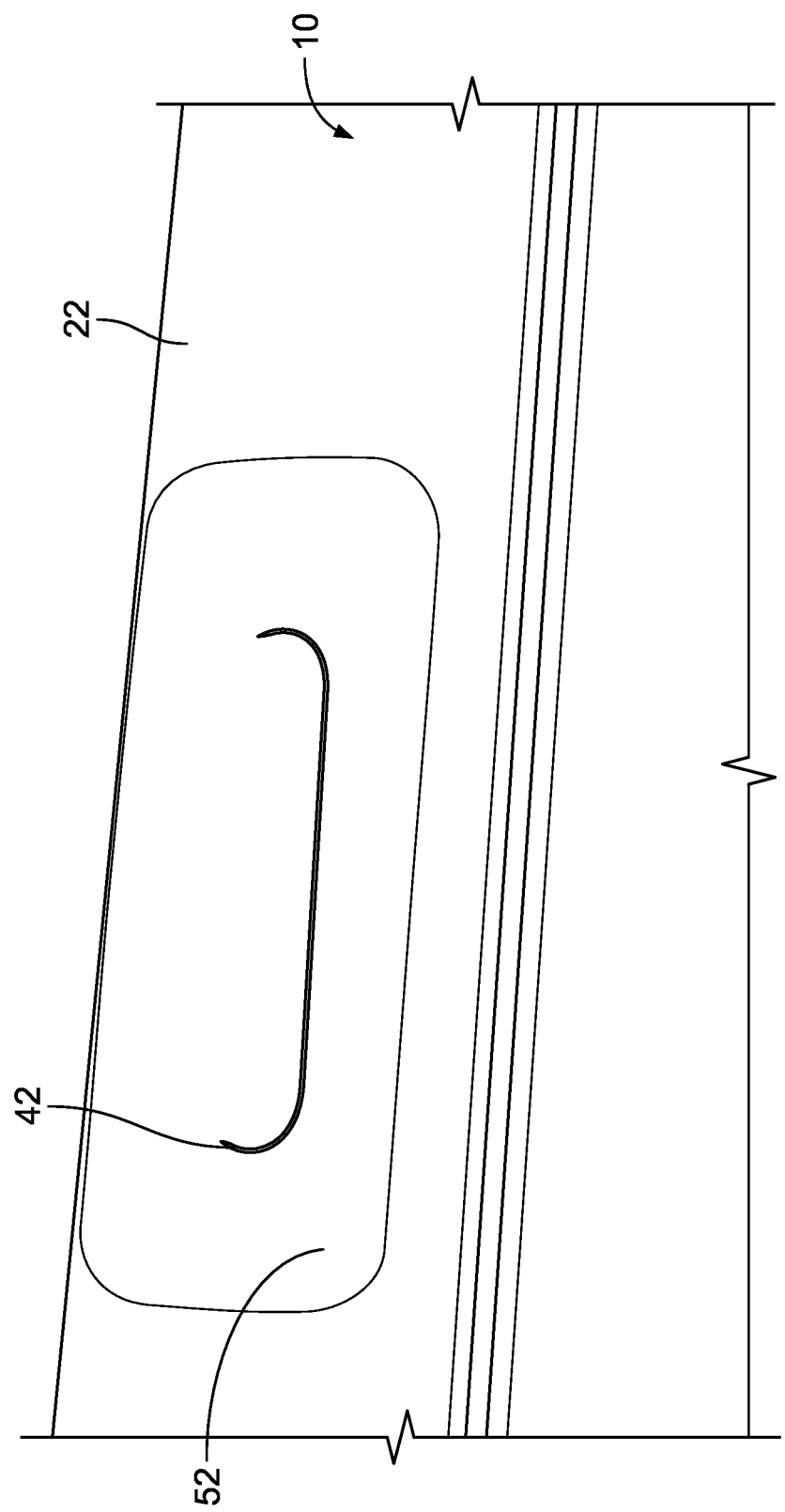

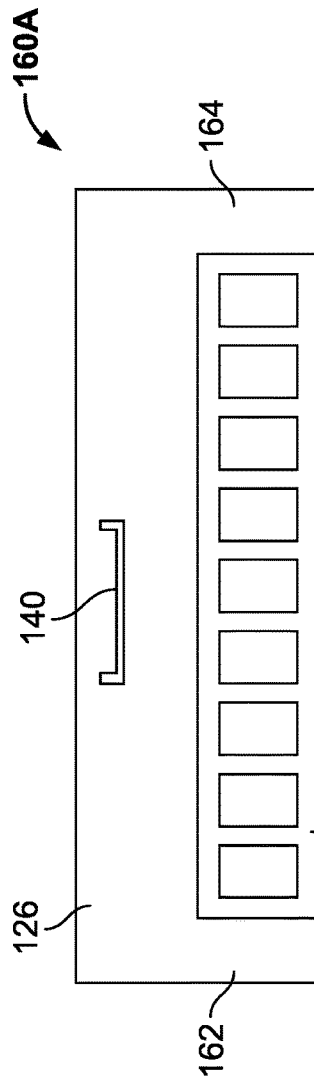
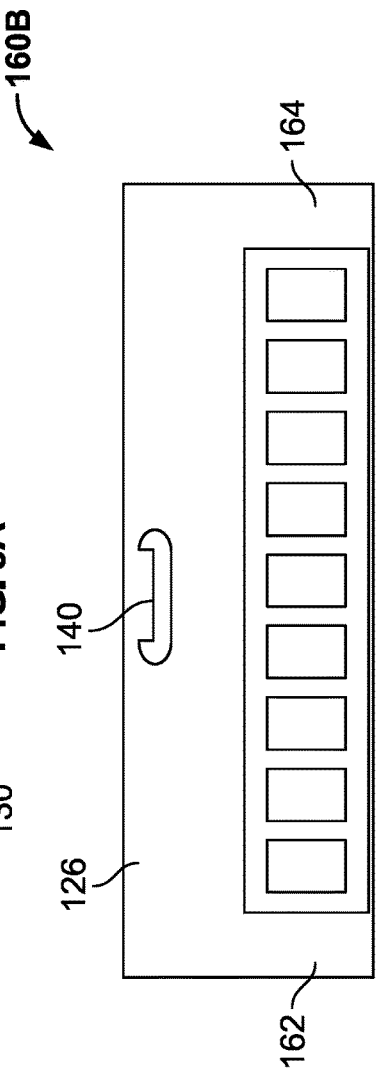
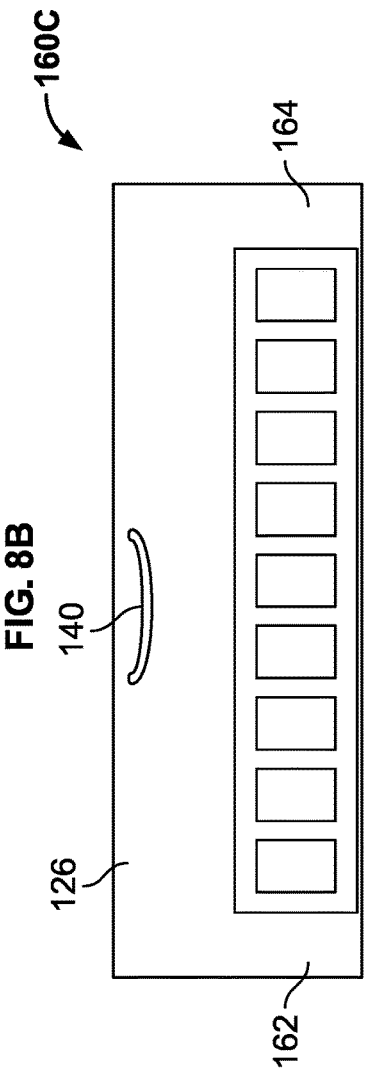

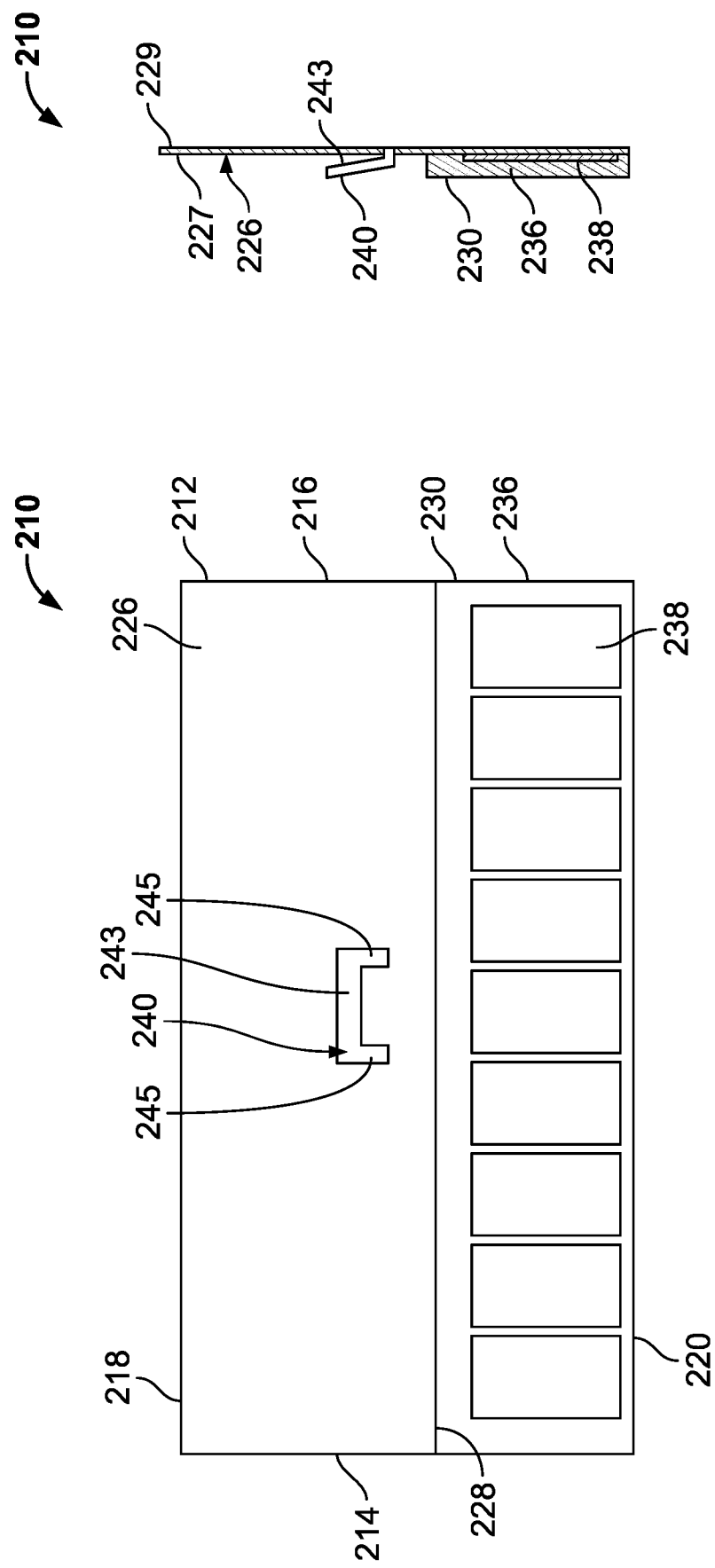

ROOFING SHINGLES WITH HANDLES

CROSS-REFERENCE TO RELATED APPLICATION

This application is a continuation of U.S. patent application Ser. No. 17/524,515, filed Nov. 11, 2021, entitled "ROOFING SHINGLES WITH HANDLES", which claims the benefit of U.S. Provisional Patent Application Ser. No. 63/113,072, filed Nov. 12, 2021, entitled "ROOFING SHINGLES WITH HANDLES," and U.S. Provisional Patent Application Ser. No. 63/122,025, filed Dec. 7, 2021, entitled "ROOFING SHINGLES WITH HANDLES," the contents of each of which are incorporated herein by reference in its entirety.

FIELD OF THE INVENTION

The present invention relates to roofing shingles and, more particularly, roofing shingles with handles to facilitate carrying and transportation of same.

BACKGROUND OF THE INVENTION

Roofing systems having roofing shingles and solar shingles are commonly installed on roofing of structures. What is needed are roofing shingles and solar shingles having features for efficient carrying and transportation thereof.

SUMMARY OF THE INVENTION

In some embodiments, a roofing shingle includes a first end, a second end opposite the first end, and a first edge extending from the first end to the second end; and a head lap extending from the first end to the second end, and at least one solar cell, wherein the head lap includes at least one handle located between the first end and the second end and proximate to the first edge, wherein the at least one handle includes at least one cutout and a gripping portion, and wherein the at least one cutout is sized and shaped to receive an external object to facilitate transporting the shingle by a user.

In some embodiments, the roofing shingle further includes a first surface and a second surface opposite the first surface, and wherein the at least one cutout includes an aperture extending from the first surface to the second surface. In some embodiments, the at least one cutout includes a flap having a first portion integral with the head lap and a second free portion extending from the first portion. In some embodiments, the flap is moveable from a first position, in which the second free portion of the flap is substantially positioned within the aperture, and a second position, in which the second free portion of the flap is located outside of the aperture. In some embodiments, the at least one cutout includes a shape selected from the group consisting of a rectangle, a square, a rounded rectangle, an ellipse, a circle, a triangle, and a polygon. In some embodiments, the at least one cutout includes a plurality of cutouts.

In some embodiments, the roofing shingle includes a layer surrounding the at least one cutout on at least one of the first surface and the second surface. In some embodiments, the layer is composed of a polymer. In some embodiments, the at least one handle is attached to the head lap. In some embodiments, the at least one handle includes a pair of legs extending from the gripping portion and attached to the head lap. In some embodiments, the at least one handle is moveable between a retracted position, in which the gripping portion is substantially juxtaposed with the head lap, and an extended position, in which the gripping portion extends outwardly from the head lap. In some embodiments, the roofing shingle is configured to be carried and transported with another one of the roofing shingle, and wherein the at least one cutout of the shingle substantially aligns with the at least one cutout of the another one of the roofing shingle.

In some embodiments, a system includes a plurality of roofing shingles, each roofing shingle of the plurality of roofing shingles includes a first end, a second end opposite the first end, and a first edge extending from the first end to the second end; and a head lap extending from the first end to the second end, and at least one solar cell, wherein the head lap includes at least one handle located between the first end and the second end and proximate to the first edge, and wherein the at least one handle includes at least one cutout and a gripping portion, and an external object; wherein the at least one cutout of each of the plurality of roofing shingles is sized and shaped to receive the external object and wherein the external object is configured to extend through each of the at least one cutout of the plurality of roofing systems. In some embodiments, the external object includes a tool. In some embodiments, the external object includes a hook.

In some embodiments, a method comprises the steps of obtaining a roofing shingle that includes a first end, a second end opposite the first end, and a first edge extending from the first end to the second end; a head lap extending from the first end to the second end, and at least one solar cell, attaching at least one handle between the first end and the second end and proximate to the first edge of the head lap, wherein the at least one handle includes at least one cutout and a gripping portion, and wherein the at least one cutout is sized and shaped to receive an external object to facilitate transporting the shingle by a user. In some embodiments, the at least one handle is ultrasonically welded to the head lap. In some embodiments, the at least one handle is heat welded to the head lap. In some embodiments, the at least one handle is thermally bonded to the head lap. In some embodiments, the at least one handle is attached to the head lap by an adhesive.

BRIEF DESCRIPTION OF THE DRAWINGS

FIG. 4 shows another embodiment of a roofing shingle and a handle employed by the shingle;

FIGS. 8A through 8C are top plan views of embodiments of a roofing shingle; and FIGS. 9A and 9B are top elevational and side cross-sectional views of an embodiment of a roofing shingle.

DETAILED DESCRIPTION

Figure 1A:
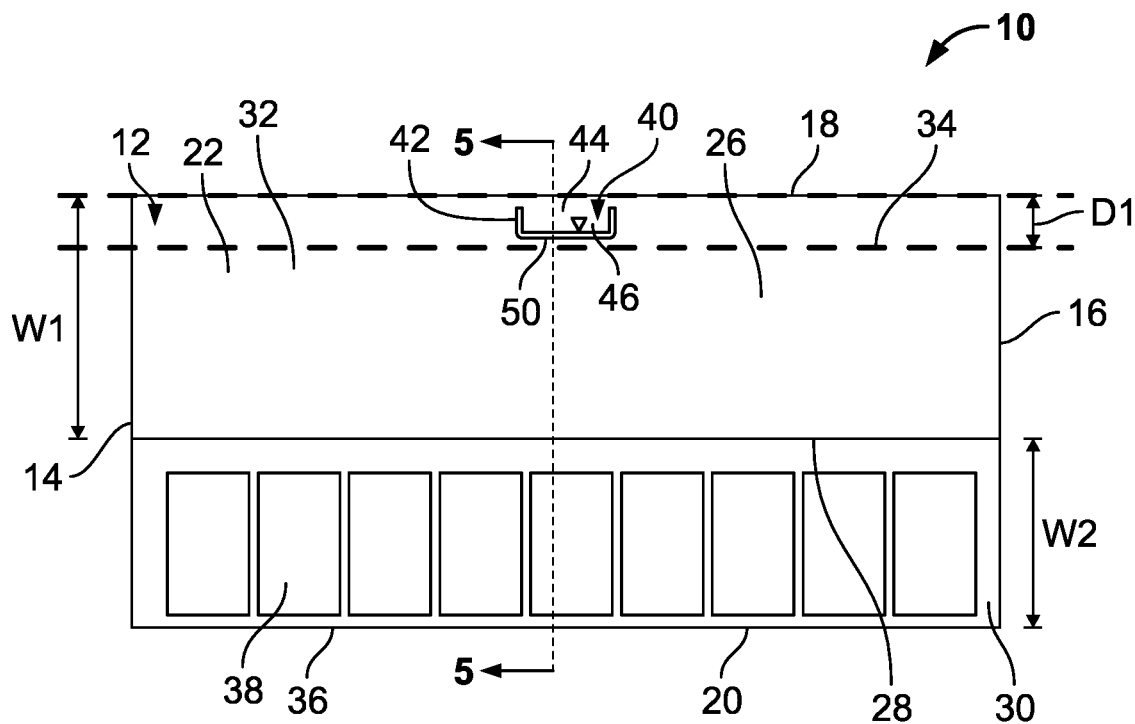
FIGS. 1A and 1B are a top elevational view and a rear elevational view, respectively, of embodiments of a roofing shingle.
Figure 1B:
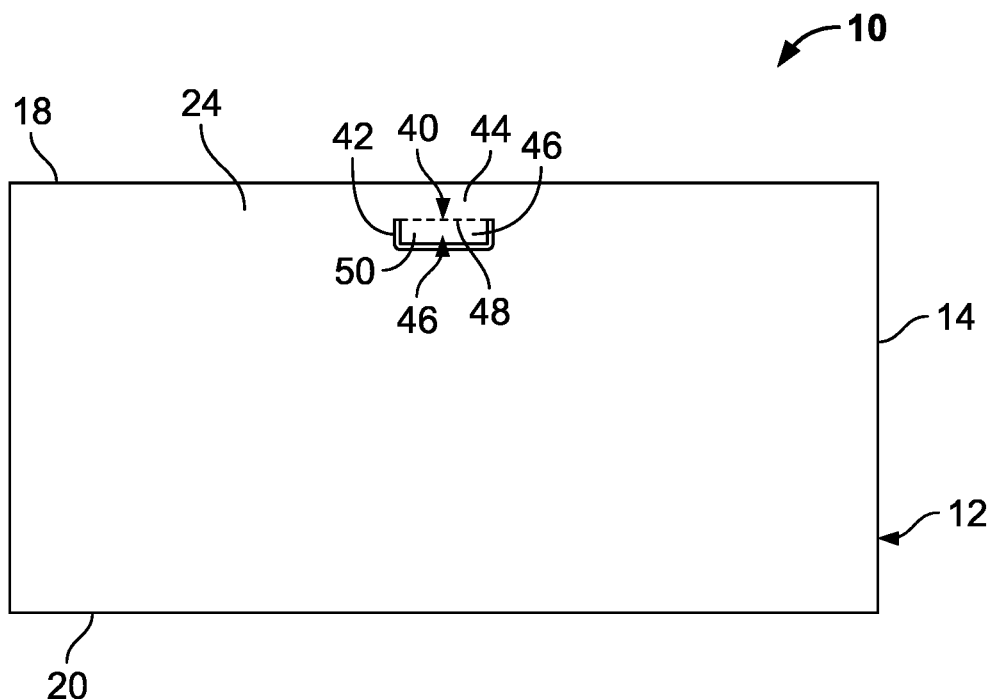

Referring to FIGS. 1A and 1B, in some embodiments, a shingle 10 includes a first layer 12 having a first end 14, a second end 16 opposite the first end 14, a first edge 18 extending from the first end 14 to the second end 16, and a second edge 20 opposite the first edge 18 and extending from the first end 14 to the second end 16. In some embodiments, the first layer includes a first surface 22 and a second surface 24 opposite the first surface 22.

In some embodiments, the first layer 12 is composed of a polymer. In some embodiments, the first layer 12 includes thermoplastic polyolefin (TPO). In other embodiments, the first layer 12 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the first layer 12 includes a thickness of 0.1 mm to 5 mm. In another embodiment, the first layer 12 includes a thickness of 0.1 mm to 4.5 mm. In another embodiment, the first layer 12 includes a thickness of 0.1 mm to 4 mm. In another embodiment, the first layer 12 includes a thickness of 0.1 mm to 3.5 mm. In another embodiment, the first layer 12 includes a thickness of 0.1 mm to 3 mm. In another embodiment, the first layer 12 includes a thickness of 0.1 mm to 2.5 mm. In another embodiment, the first layer 12 includes a thickness of 0.1 mm to 2 mm. In another embodiment, the first layer 12 includes a thickness of 0.1 mm to 1.5 mm. In another embodiment, the first layer 12 includes a thickness of 0.1 mm to 1 mm. In another embodiment, the first layer 12 includes a thickness of 0.1 mm to 0.5 mm.

In some embodiments, the first layer 12 includes a thickness of 0.5 mm to 5 mm. In another embodiment, the first layer 12 includes a thickness of 0.5 mm to 4.5 mm. In another embodiment, the first layer 12 includes a thickness of 0.5 mm to 4 mm. In another embodiment, the first layer 12 includes a thickness of 0.5 mm to 3.5 mm. In another embodiment, the first layer 12 includes a thickness of 0.5 mm to 3 mm. In another embodiment, the first layer 12 includes a thickness of 0.5 mm to 2.5 mm. In another embodiment, the first layer 12 includes a thickness of 0.5 mm to 2 mm. In another embodiment, the first layer 12 includes a thickness of 0.5 mm to 1.5 mm. In another embodiment, the first layer 12 includes a thickness of 0.5 mm to 1 mm.

In some embodiments, the first layer 12 includes a thickness of 1 mm to 5 mm. In another embodiment, the first layer 12 includes a thickness of 1 mm to 4.5 mm. In another embodiment, the first layer 12 includes a thickness of 1 mm to 4 mm. In another embodiment, the first layer 12 includes a thickness of 1 mm to 3.5 mm. In another embodiment, the first layer 12 includes a thickness of 1 mm to 3 mm. In another embodiment, the first layer 12 includes a thickness of 1 mm to 2.5 mm. In another embodiment, the first layer 12 includes a thickness of 1 mm to 2 mm. In another embodiment, the first layer 12 includes a thickness of 1 mm to 1.5 mm.

In some embodiments, the first layer 12 includes a thickness of 1.5 mm to 5 mm. In another embodiment, the first layer 12 includes a thickness of 1.5 mm to 4.5 mm. In another embodiment, the first layer 12 includes a thickness of 1.5 mm to 4 mm. In another embodiment, the first layer 12 includes a thickness of 1.5 mm to 3.5 mm. In another embodiment, the first layer 12 includes a thickness of 1.5 mm to 3 mm. In another embodiment, the first layer 12 includes a thickness of 1.5 mm to 2.5 mm. In another embodiment, the first layer 12 includes a thickness of 1.5 mm to 2 mm.

In some embodiments, the first layer 12 includes a thickness of 2 mm to 5 mm. In another embodiment, the first layer 12 includes a thickness of 2 mm to 4.5 mm. In another embodiment, the first layer 12 includes a thickness of 2 mm to 4 mm. In another embodiment, the first layer 12 includes a thickness of 2 mm to 3.5 mm. In another embodiment, the first layer 12 includes a thickness of 2 mm to 3 mm. In another embodiment, the first layer 12 includes a thickness of 2 mm to 2.5 mm.

In some embodiments, the first layer 12 includes a thickness of 2.5 mm to 5 mm. In another embodiment, the first layer 12 includes a thickness of 2.5 mm to 4.5 mm. In another embodiment, the first layer 12 includes a thickness of 2.5 mm to 4 mm. In another embodiment, the first layer 12 includes a thickness of 2.5 mm to 3.5 mm. In another embodiment, the first layer 12 includes a thickness of 2.5 mm to 3 mm.

In some embodiments, the first layer 12 includes a thickness of 3 mm to 5 mm. In another embodiment, the first layer 12 includes a thickness of 3 mm to 4.5 mm. In another embodiment, the first layer 12 includes a thickness of 3 mm to 4 mm. In another embodiment, the first layer 12 includes a thickness of 3 mm to 3.5 mm. In some embodiments, the first layer 12 includes a thickness of 3.5 mm to 5 mm. In another embodiment, the first layer 12 includes a thickness of 3.5 mm to 4.5 mm. In another embodiment, the first layer 12 includes a thickness of 3.5 mm to 4 mm. In some embodiments, the first layer 12 includes a thickness of 4 mm to 5 mm. In another embodiment, the first layer 12 includes a thickness of 4 mm to 4.5 mm. In some embodiments, the first layer 12 includes a thickness of 4.5 mm to 5 mm.

In some embodiments, the first layer 12 includes a thickness of 0.1 mm. In some embodiments, the first layer 12 includes a thickness of 0.5 mm. In some embodiments, the first layer 12 includes a thickness of 1 mm. In some embodiments, the first layer 12 includes a thickness of 1.5 mm. In some embodiments, the first layer 12 includes a thickness of 2 mm. In some embodiments, the first layer 12 includes a thickness of 2.5 mm. In some embodiments, the first layer 12 includes a thickness of 3 mm. In some embodiments, the first layer 12 includes a thickness of 3.5 mm. In some embodiments, the first layer 12 includes a thickness of 4 mm. In some embodiments, the first layer 12 includes a thickness of 4.5 mm. In some embodiments, the first layer 12 includes a thickness of 5 mm.

In some embodiments, the shingle 10 includes a head lap 26 that extends from the first end 14 to the second end 16. In some embodiments, the head lap 26 extends from the first edge 18 to a first location 28 intermediate the first edge 18 and the second edge 20. In some embodiments, the shingle 10 includes a reveal portion 30 extending from the first end 14 to the second end 16. In some embodiments, the reveal portion 30 extends from the second edge 20 to the first location 28. In some embodiments, the reveal portion 30 is located adjacent to the head lap 26.

In some embodiments, the head lap 26 includes a first width W1 and the reveal portion includes a second width W2. In some embodiments, the first width W1 is greater than the second width W2. In some embodiments, the first width W1 extends from the first edge 18 to the first location 28. In some embodiments, the second width W2 extends from the second edge 20 to the first location 28.

In some embodiments, the head lap 26 includes a first area 32 extending from the first end 14 to the second end 16 and extending from the first edge 18 to a second location 34 intermediate the first edge 18 and the second edge 20. In some embodiments, the first area 32 extends a distance D1 approximately equal to the difference between the first width W1 and the second width W2.

In some embodiments, the first width W1 is 6 inches to 40 inches. In another embodiment, the first width W1 is 6 inches to 35 inches. In another embodiment, the first width W1 is 6 inches to 30 inches. In another embodiment, the first width W1 is 6 inches to 25 inches. In another embodiment, the first width W1 is 6 inches to 20 inches. In another embodiment, the first width W1 is 6 inches to 15 inches. In another embodiment, the first width W1 is 6 inches to 10 inches.

In some embodiments, the first width W1 is 10 inches to 40 inches. In another embodiment, the first width W1 is 10 inches to 35 inches. In another embodiment, the first width W1 is 10 inches to 30 inches. In another embodiment, the first width W1 is 10 inches to 25 inches. In another embodiment, the first width W1 is 10 inches to 20 inches. In another embodiment, the first width W1 is 10 inches to 15 inches.

In some embodiments, the first width W1 is 15 inches to 40 inches. In another embodiment, the first width W1 is 15 inches to 35 inches. In another embodiment, the first width W1 is 15 inches to 30 inches. In another embodiment, the first width W1 is 15 inches to 25 inches. In another embodiment, the first width W1 is 15 inches to 20 inches.

In some embodiments, the first width W1 is 20 inches to 40 inches. In another embodiment, the first width W1 is 20 inches to 35 inches. In another embodiment, the first width W1 is 20 inches to 30 inches. In another embodiment, the first width W1 is 20 inches to 25 inches.

In some embodiments, the first width W1 is 25 inches to 40 inches. In another embodiment, the first width W1 is 25 inches to 35 inches. In another embodiment, the first width W1 is 25 inches to 30 inches. In some embodiments, the first width W1 is 30 inches to 40 inches. In another embodiment, the first width W1 is 30 inches to 35 inches. In some embodiments, the first width W1 is 35 inches to 40 inches.

In some embodiments, the first width W1 is 6 inches. In some embodiments, the first width W1 is 10 inches. In some embodiments, the first width W1 is 15 inches. In some embodiments, the first width W1 is 20 inches. In some embodiments, the first width W1 is 25 inches. In some embodiments, the first width W1 is 30 inches. In some embodiments, the first width W1 is 35 inches. In some embodiments, the first width W1 is 40 inches.

In some embodiments, the second width W2 is 5 inches to 18 inches. In another embodiment, the second width W2 is 5 inches to 17 inches. In another embodiment, the second width W2 is 5 inches to 16 inches. In another embodiment, the second width W2 is 5 inches to 15 inches. In another embodiment, the second width W2 is 5 inches to 14 inches. In another embodiment, the second width W2 is 5 inches to 13 inches. In another embodiment, the second width W2 is 5 inches to 12 inches. In another embodiment, the second width W2 is 5 inches to 11 inches. In another embodiment, the second width W2 is 5 inches to 10 inches. In another embodiment, the second width W2 is 5 inches to 9 inches. In another embodiment, the second width W2 is 5 inches to 8 inches. In another embodiment, the second width W2 is 5 inches to 7 inches. In another embodiment, the second width W2 is 5 inches to 6 inches.

In some embodiments, the second width W2 is 6 inches to 18 inches. In another embodiment, the second width W2 is 6 inches to 17 inches. In another embodiment, the second width W2 is 6 inches to 16 inches. In another embodiment, the second width W2 is 6 inches to 15 inches. In another embodiment, the second width W2 is 6 inches to 14 inches. In another embodiment, the second width W2 is 6 inches to 13 inches. In another embodiment, the second width W2 is 6 inches to 12 inches. In another embodiment, the second width W2 is 6 inches to 11 inches. In another embodiment, the second width W2 is 6 inches to 10 inches. In another embodiment, the second width W2 is 6 inches to 9 inches. In another embodiment, the second width W2 is 6 inches to 8 inches. In another embodiment, the second width W2 is 6 inches to 7 inches.

In some embodiments, the second width W2 is 7 inches to 18 inches. In another embodiment, the second width W2 is 7 inches to 17 inches. In another embodiment, the second width W2 is 7 inches to 16 inches. In another embodiment, the second width W2 is 7 inches to 15 inches. In another embodiment, the second width W2 is 7 inches to 14 inches. In another embodiment, the second width W2 is 7 inches to 13 inches. In another embodiment, the second width W2 is 7 inches to 12 inches. In another embodiment, the second width W2 is 7 inches to 11 inches. In another embodiment, the second width W2 is 7 inches to 10 inches. In another embodiment, the second width W2 is 7 inches to 9 inches. In another embodiment, the second width W2 is 7 inches to 8 inches.

In some embodiments, the second width W2 is 8 inches to 18 inches. In another embodiment, the second width W2 is 8 inches to 17 inches. In another embodiment, the second width W2 is 8 inches to 16 inches. In another embodiment, the second width W2 is 8 inches to 15 inches. In another embodiment, the second width W2 is 8 inches to 14 inches. In another embodiment, the second width W2 is 8 inches to 13 inches. In another embodiment, the second width W2 is 8 inches to 12 inches. In another embodiment, the second width W2 is 8 inches to 11 inches. In another embodiment, the second width W2 is 8 inches to 10 inches. In another embodiment, the second width W2 is 8 inches to 9 inches.

In some embodiments, the second width W2 is 9 inches to 18 inches. In another embodiment, the second width W2 is 9 inches to 17 inches. In another embodiment, the second width W2 is 9 inches to 16 inches. In another embodiment, the second width W2 is 9 inches to 15 inches. In another embodiment, the second width W2 is 9 inches to 14 inches. In another embodiment, the second width W2 is 9 inches to 13 inches. In another embodiment, the second width W2 is 9 inches to 12 inches. In another embodiment, the second width W2 is 9 inches to 11 inches. In another embodiment, the second width W2 is 9 inches to 10 inches.

In some embodiments, the second width W2 is 10 inches to 18 inches. In another embodiment, the second width W2 is 10 inches to 17 inches. In another embodiment, the second width W2 is 10 inches to 16 inches. In another embodiment, the second width W2 is 10 inches to 15 inches. In another embodiment, the second width W2 is 10 inches to 14 inches. In another embodiment, the second width W2 is 10 inches to 13 inches. In another embodiment, the second width W2 is 10 inches to 12 inches. In another embodiment, the second width W2 is 10 inches to 11 inches.

In some embodiments, the second width W2 is 11 inches to 18 inches. In another embodiment, the second width W2 is 11 inches to 17 inches. In another embodiment, the second width W2 is 11 inches to 16 inches. In another embodiment, the second width W2 is 11 inches to 15 inches. In another embodiment, the second width W2 is 11 inches to 14 inches. In another embodiment, the second width W2 is 11 inches to 13 inches. In another embodiment, the second width W2 is 11 inches to 12 inches.

In some embodiments, the second width W2 is 12 inches to 18 inches. In another embodiment, the second width W2 is 12 inches to 17 inches. In another embodiment, the second width W2 is 12 inches to 16 inches. In another embodiment, the second width W2 is 12 inches to 15 inches. In another embodiment, the second width W2 is 12 inches to 14 inches. In another embodiment, the second width W2 is 12 inches to 13 inches.

In some embodiments, the second width W2 is 13 inches to 18 inches. In another embodiment, the second width W2 is 13 inches to 17 inches. In another embodiment, the second width W2 is 13 inches to 16 inches. In another embodiment, the second width W2 is 13 inches to 15 inches. In another embodiment, the second width W2 is 13 inches to 14 inches. In some embodiments, the second width W2 is 14 inches to 18 inches. In another embodiment, the second width W2 is 14 inches to 17 inches. In another embodiment, the second width W2 is 14 inches to 16 inches. In another embodiment, the second width W2 is 14 inches to 15 inches. In some embodiments, the second width W2 is 15 inches to 18 inches. In another embodiment, the second width W2 is 15 inches to 17 inches. In another embodiment, the second width W2 is 15 inches to 16 inches. In some embodiments, the second width W2 is 16 inches to 18 inches. In another embodiment, the second width W2 is 16 inches to 17 inches. In another embodiment, the second width W2 is 17 inches to 18 inches.

In some embodiments, the second width W2 is 5 inches. In some embodiments, the second width W2 is 6 inches. In some embodiments, the second width W2 is 7 inches. In some embodiments, the second width W2 is 8 inches. In some embodiments, the second width W2 is 9 inches. In some embodiments, the second width W2 is 10 inches. In some embodiments, the second width W2 is 11 inches. In some embodiments, the second width W2 is 12 inches. In some embodiments, the second width W2 is 13 inches. In some embodiments, the second width W2 is 14 inches. In some embodiments, the second width W2 is 15 inches. In some embodiments, the second width W2 is 16 inches. In some embodiments, the second width W2 is 17 inches. In some embodiments, the second width W2 is 18 inches.

Still referring to FIGS. 1A and 1B, in some embodiments, the reveal portion 30 includes a second layer 36 overlaying the first layer 12. In some embodiments, the second layer 36 includes at least one solar cell 38. In some embodiments, the at least one solar cell 38 includes a plurality of solar cells.

In some embodiments, the second layer 36 is composed of a polymer. In some embodiments, the second layer 36 includes thermoplastic polyolefin (TPO). In other embodiments, the second layer 36 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the first layer 12 and the second layer 36 are laminated. In some embodiments, the second layer 36 is ultrasonically welded to the first layer 12. In some embodiments, the second layer 36 is heat welded to the first layer 12. In some embodiments, the second layer 36 is thermally bonded to the first layer 12.

In some embodiments, the head lap 26 includes a handle 40. In some embodiments, the handle 40 is located intermediate the first end 14 and the second end 16. In some embodiments, the handle 40 is located approximately midway between the first end 14 and the second end 16. In some embodiments, the handle 40 is located proximate to the first end 14. In some embodiments, the handle 40 is located proximate to the second end 16. In some embodiments, the handle 40 includes a cutout 42 and a gripping portion 44 formed by the cutout 42. In some embodiments, the cutout 42 is located intermediate the first end 14 and the second end 16. In some embodiments, the cutout is located proximate to the first edge 18. In some embodiments, the cutout 42 is located within the first area 32.

In some embodiments, the cutout 42 is an aperture extending from the first surface 22 to the second surface 24. In some embodiments, the handle 40 includes a flap 46 having a first portion 48 integral with the head lap 26 and a second free portion 50 extending from the first portion 48. In some embodiments, the flap 46 is moveable from a first position, in which the second free portion 50 is substantially positioned within the cutout 42, and a second position, in which the second free portion 50 is located outside of the cutout 42. In some embodiments, the flap 46 is moveable from its first position to its second position when a user inserts its hand or a tool in the aperture to grab the shingle 10 for carrying or holding.

Figure 1C:
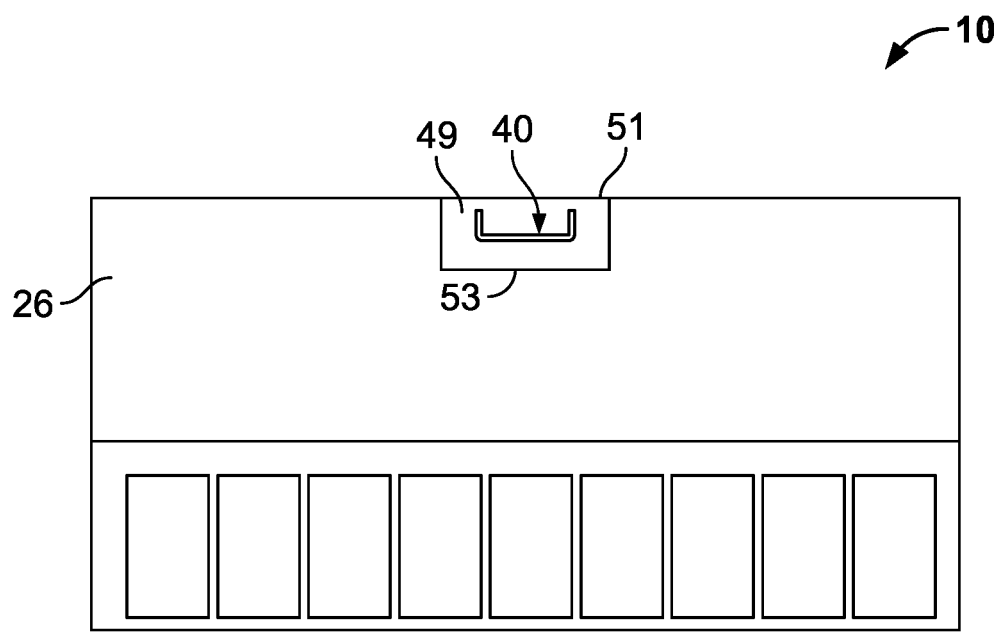
FIG. 1C is a top elevational view of an embodiment of a roofing shingle.

Referring to FIG. 1C, in another embodiment, the shingle 10 includes a flap 49 that overlays the handle 40. In some embodiments, the flap 49 includes a first edge 51 and a second edge 53 opposite the first edge 51. In some embodiments, the first edge 51 is attached to the head lap 26. In some embodiments, the second edge 53 is a free edge that enables the flap 49 to be moveable from a first position, in which the flap 49 overlays the handle 40, and a second position, in which the flap 49 is flexed or bent away from the handle to allow a user to access the handle 40. In some embodiments, the flap 49 is a watersheeding layer. In some embodiments, the flap 49 is composed of a polymer. In some embodiments, the flap 49 includes thermoplastic polyolefin (TPO). In other embodiments, the flap 49 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the flap 49 is ultrasonically welded to the head lap 26. In some embodiments, the flap 49 is heat welded to the head lap 26. In some embodiments, the flap 49 is thermally bonded to the head lap 26. In some embodiments, the flap 49 is attached to the head lap 26 by an adhesive.

Figure 2:
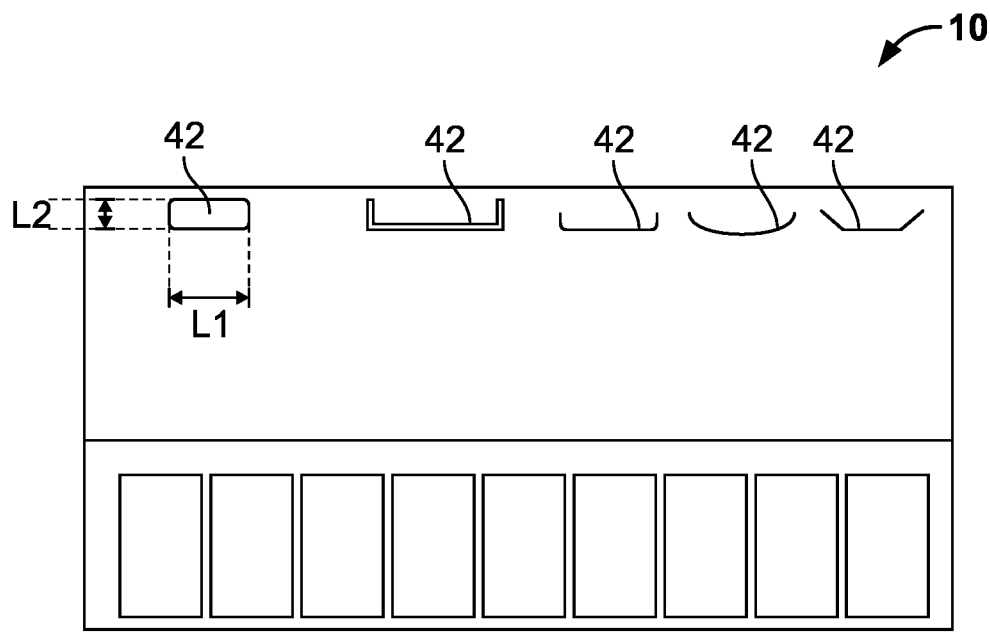
FIG. 2 is a top elevational view of an embodiment of a roofing shingle showing different embodiments of a handle employed by the shingle.

Referring to FIG. 2, in some embodiments, the cutout 42 includes a rectangular shape. In another embodiment, the cutout 42 includes a square shape. In some embodiments, the cutout 42 includes a rounded rectangular shape. In some embodiments, the cutout 42 includes an elliptical shape. In some embodiments, the cutout 42 includes a semi-elliptical shape. In some embodiments, the cutout 42 includes a circular shape. In some embodiments, the cutout 42 includes a semi-circular shape. In some embodiments, the cutout 42 includes a triangular shape. In some embodiments, the cutout 42 is polygonal in shape.

In some embodiments, the 40 includes a plurality of handles 40. In some embodiments, each of the plurality of handles 40 is spaced apart from one another with the first area 32.

In some embodiments, the cutout 42 includes a length L1 of 1 inch to 10 inches. In another embodiment, the cutout 42 includes a length L1 of 1 inch to 9 inches. In another embodiment, the cutout 42 includes a length L1 of 1 inch to 8 inches. In another embodiment, the cutout 42 includes a length L1 of 1 inch to 7 inches. In another embodiment, the cutout 42 includes a length L1 of 1 inch to 6 inches. In another embodiment, the cutout 42 includes a length L1 of 1 inch to 5 inches. In another embodiment, the cutout 42 includes a length L1 of 1 inch to 4 inches. In another embodiment, the cutout 42 includes a length L1 of 1 inch to 3 inches. In another embodiment, the cutout 42 includes a length L1 of 1 inch to 2 inches.

In another embodiment, the cutout 42 includes a length L1 of 2 inches to 10 inches. In another embodiment, the cutout 42 includes a length L1 of 2 inches to 9 inches. In another embodiment, the cutout 42 includes a length L1 of 2 inches to 8 inches. In another embodiment, the cutout 42 includes a length L1 of 2 inches to 7 inches. In another embodiment, the cutout 42 includes a length L1 of 2 inches to 6 inches. In another embodiment, the cutout 42 includes a length L1 of 2 inches to 5 inches. In another embodiment, the cutout 42 includes a length L1 of 2 inches to 4 inches. In another embodiment, the cutout 42 includes a length L1 of 2 inches to 3 inches.

In another embodiment, the cutout 42 includes a length L1 of 3 inches to 10 inches. In another embodiment, the cutout 42 includes a length L1 of 3 inches to 9 inches. In another embodiment, the cutout 42 includes a length L1 of 3 inches to 8 inches. In another embodiment, the cutout 42 includes a length L1 of 3 inches to 7 inches. In another embodiment, the cutout 42 includes a length L1 of 3 inches to 6 inches. In another embodiment, the cutout 42 includes a length L1 of 3 inches to 5 inches. In another embodiment, the cutout 42 includes a length L1 of 3 inches to 4 inches.

In another embodiment, the cutout 42 includes a length L1 of 4 inches to 10 inches. In another embodiment, the cutout 42 includes a length L1 of 4 inches to 9 inches. In another embodiment, the cutout 42 includes a length L1 of 4 inches to 8 inches. In another embodiment, the cutout 42 includes a length L1 of 4 inches to 7 inches. In another embodiment, the cutout 42 includes a length L1 of 4 inches to 6 inches. In another embodiment, the cutout 42 includes a length L1 of 4 inches to 5 inches.

In another embodiment, the cutout 42 includes a length L1 of 5 inches to 10 inches. In another embodiment, the cutout 42 includes a length L1 of 5 inches to 9 inches. In another embodiment, the cutout 42 includes a length L1 of 5 inches to 8 inches. In another embodiment, the cutout 42 includes a length L1 of 5 inches to 7 inches. In another embodiment, the cutout 42 includes a length L1 of 5 inches to 6 inches.

In another embodiment, the cutout 42 includes a length L1 of 6 inches to 10 inches. In another embodiment, the cutout 42 includes a length L1 of 6 inches to 9 inches. In another embodiment, the cutout 42 includes a length L1 of 6 inches to 8 inches. In another embodiment, the cutout 42 includes a length L1 of 6 inches to 7 inches.

In another embodiment, the cutout 42 includes a length L1 of 7 inches to 10 inches. In another embodiment, the cutout 42 includes a length L1 of 7 inches to 9 inches. In another embodiment, the cutout 42 includes a length L1 of 7 inches to 8 inches.

In another embodiment, the cutout 42 includes a length L1 of 8 inches to 10 inches. In another embodiment, the cutout 42 includes a length L1 of 8 inches to 9 inches. In another embodiment, the cutout 42 includes a length L1 of 9 inches to 10 inches.

In another embodiment, the cutout 42 includes a length L1 of 1 inch. In another embodiment, the cutout 42 includes a length L1 of 2 inches. In another embodiment, the cutout 42 includes a length L1 of 3 inches. In another embodiment, the cutout 42 includes a length L1 of 4 inches. In another embodiment, the cutout 42 includes a length L1 of 5 inches. In another embodiment, the cutout 42 includes a length L1 of 6 inches. In another embodiment, the cutout 42 includes a length L1 of 7 inches. In another embodiment, the cutout 42 includes a length L1 of 8 inches. In another embodiment, the cutout 42 includes a length L1 of 9 inches. In another embodiment, the cutout 42 includes a length L1 of 10 inches.

In some embodiments, the cutout 42 includes a third width W3 of 0.5 inch to 5 inches. In some embodiments, the cutout 42 includes a third width W3 of 0.5 inch to 4.5 inches. In some embodiments, the cutout 42 includes a third width W3 of 0.5 inch to 4 inches. In some embodiments, the cutout 42 includes a third width W3 of 0.5 inch to 3.5 inches. In some embodiments, the cutout 42 includes a third width W3 of 0.5 inch to 3 inches. In some embodiments, the cutout 42 includes a third width W3 of 0.5 inch to 2.5 inches. In some embodiments, the cutout 42 includes a third width W3 of 0.5 inch to 2 inches. In some embodiments, the cutout 42 includes a third width W3 of 0.5 inch to 1.5 inches. In some embodiments, the cutout 42 includes a third width W3 of 0.5 inch to 1 inch.

In some embodiments, the cutout 42 includes a third width W3 of 1 inch to 5 inches. In some embodiments, the cutout 42 includes a third width W3 of 1 inch to 4.5 inches. In some embodiments, the cutout 42 includes a third width W3 of 1 inch to 4 inches. In some embodiments, the cutout 42 includes a third width W3 of 1 inch to 3.5 inches. In some embodiments, the cutout 42 includes a third width W3 of 1 inch to 3 inches. In some embodiments, the cutout 42 includes a third width W3 of 1 inch to 2.5 inches. In some embodiments, the cutout 42 includes a third width W3 of 1 inch to 2 inches. In some embodiments, the cutout 42 includes a third width W3 of 1 inch to 1.5 inches.

In some embodiments, the cutout 42 includes a third width W3 of 1.5 inches to 5 inches. In some embodiments, the cutout 42 includes a third width W3 of 1.5 inches to 4.5 inches. In some embodiments, the cutout 42 includes a third width W3 of 1.5 inches to 4 inches. In some embodiments, the cutout 42 includes a third width W3 of 1.5 inches to 3.5 inches. In some embodiments, the cutout 42 includes a third width W3 of 1.5 inches to 3 inches. In some embodiments, the cutout 42 includes a third width W3 of 1.5 inches to 2.5 inches. In some embodiments, the cutout 42 includes a third width W3 of 1.5 inches to 2 inches.

In some embodiments, the cutout 42 includes a third width W3 of 2 inches to 5 inches. In some embodiments, the cutout 42 includes a third width W3 of 2 inches to 4.5 inches. In some embodiments, the cutout 42 includes a third width W3 of 2 inches to 4 inches. In some embodiments, the cutout 42 includes a third width W3 of 2 inches to 3.5 inches. In some embodiments, the cutout 42 includes a third width W3 of 2 inches to 3 inches. In some embodiments, the cutout 42 includes a third width W3 of 2 inches to 2.5 inches.

In some embodiments, the cutout 42 includes a third width W3 of 2.5 inches to 5 inches. In some embodiments, the cutout 42 includes a third width W3 of 2.5 inches to 4.5 inches. In some embodiments, the cutout 42 includes a third width W3 of 2.5 inches to 4 inches. In some embodiments, the cutout 42 includes a third width W3 of 2.5 inches to 3.5 inches. In some embodiments, the cutout 42 includes a third width W3 of 2.5 inches to 3 inches.

In some embodiments, the cutout 42 includes a third width W3 of 3 inches to 5 inches. In some embodiments, the cutout 42 includes a third width W3 of 3 inches to 4.5 inches. In some embodiments, the cutout 42 includes a third width W3 of 3 inches to 4 inches. In some embodiments, the cutout 42 includes a third width W3 of 3 inches to 3.5 inches.

In some embodiments, the cutout 42 includes a third width W3 of 3.5 inches to 5 inches. In some embodiments, the cutout 42 includes a third width W3 of 3.5 inches to 4.5 inches. In some embodiments, the cutout 42 includes a third width W3 of 3.5 inches to 4 inches.

In some embodiments, the cutout 42 includes a third width W3 of 4 inches to 5 inches. In some embodiments, the cutout 42 includes a third width W3 of 4 inches to 4.5 inches. In some embodiments, the cutout 42 includes a third width W3 of 4.5 inches to 5 inches.

In some embodiments, the cutout 42 includes a third width W3 of 0.5 inch. In some embodiments, the cutout 42 includes a third width W3 of 1 inch. In some embodiments, the cutout 42 includes a third width W3 of 1.5 inches. In some embodiments, the cutout 42 includes a third width W3 of 2 inches. In some embodiments, the cutout 42 includes a third width W3 of 2.5 inches. In some embodiments, the cutout 42 includes a third width W3 of 3 inches. In some embodiments, the cutout 42 includes a third width W3 of 3.5 inches. In some embodiments, the cutout 42 includes a third width W3 of 4 inches. In some embodiments, the cutout 42 includes a third width W3 of 4.5 inches. In some embodiments, the cutout 42 includes a third width W3 of 5 inches.

In some embodiments, the shingle 10 is configured to be affixed to a roof deck 100 by a plurality of fasteners 102. In some embodiments, the plurality of fasteners 102 includes a plurality of nails. In another embodiment, the plurality of fasteners 102 includes a plurality of screws. In another embodiment, the plurality of fasteners 102 includes a plurality of staples. In another embodiment, the plurality of fasteners 102 includes a plurality of rivets. In some embodiments, the head lap 26 is configured to receive the plurality of fasteners 102. In some embodiments, the plurality of fasteners 102 is installed outside the first area 32. In another embodiment, the plurality of fasteners 102 may be installed within the first area 32. In another embodiment, the shingle 10 is configured to be affixed to the roof deck 100 by an adhesive.

Figure 3:
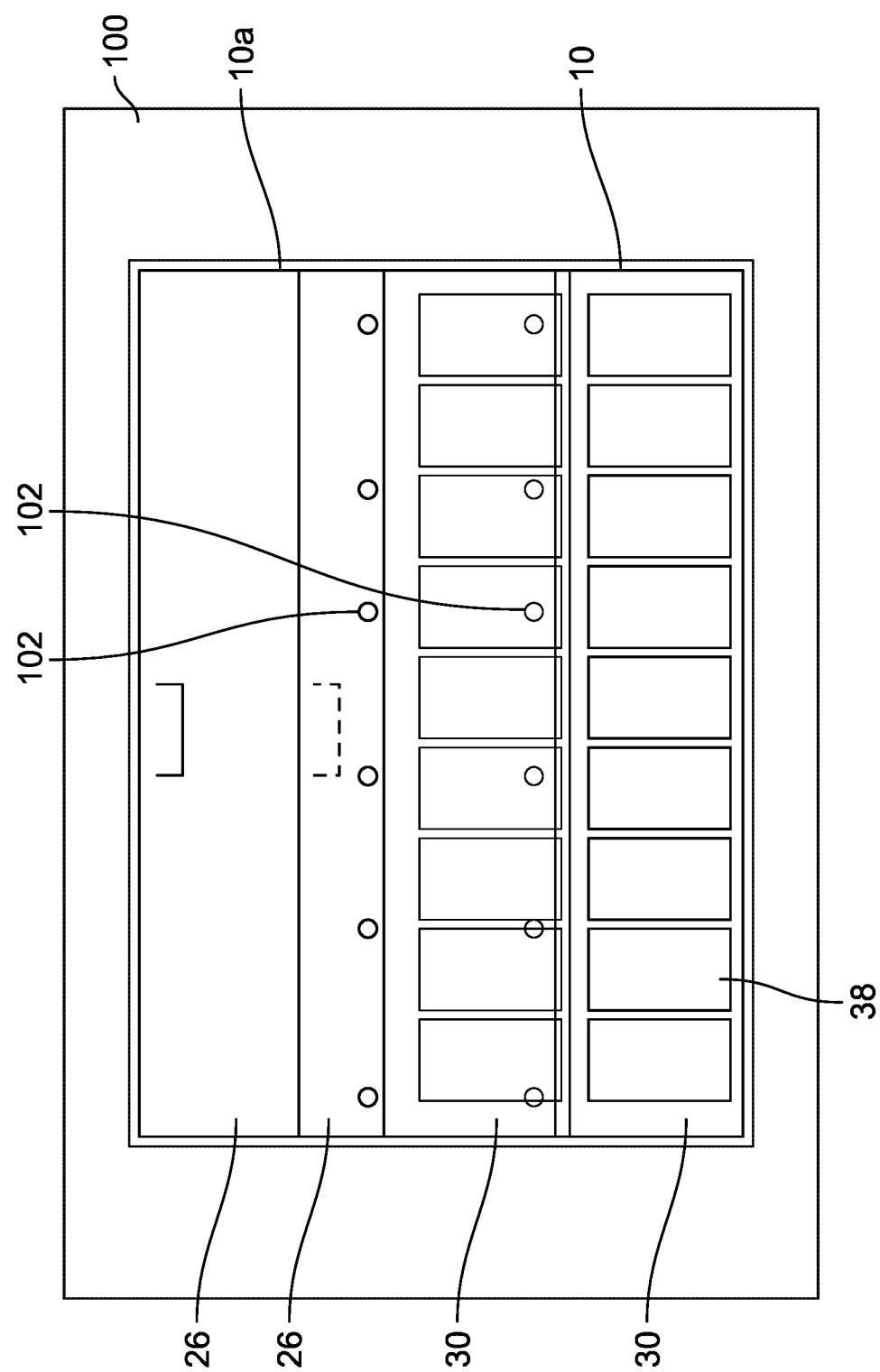
FIG. 3 is a top elevational view of an embodiment of a system of the roofing shingle shown in FIGS. 1A and 1B.

Referring to FIG. 3, in some embodiments, a shingle 10a having a similar structure of the shingle 10 is configured to overlay at least the head lap 26 of the shingle 10. In some embodiments, the reveal portion 30 of the shingle 10 is exposed to the external environment when the shingle 10a overlays the shingle 10. In some embodiments, the at least one solar cell 38 of the shingle 10 is exposed to the external environment when the shingle 10a overlays the shingle 10. In some embodiments, the reveal portion 30 of the shingle 10a is substantially aligned with the reveal portion 30 of the shingle 10. In some embodiments, the head lap 26 of the shingle 10a is configured to receive another of the plurality of fasteners 102.

Referring to FIG. 4, in some embodiments, the shingle 10 includes a layer 52 overlaying the first layer 12 and surrounding the cutout 42. In some embodiments, the layer 52 is located on the first surface 22. In another embodiment, the layer 52 is located on the second surface 24. In another embodiment, the layer 52 is located on the first surface 22 and another one of the layers 52 is located on the second surface 24. In some embodiments, the layer 52 reinforces the strength of the shingle around the cutout 42 to eliminate or minimize tearing of the handle 40 when gripped or held by a user or other object.

In some embodiments, the layer 52 is composed of a polymer. In some embodiments, the layer 52 includes thermoplastic polyolefin (TPO). In other embodiments, the layer 52 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In another embodiment, the layer 52 includes a fabric. In some embodiments, the fabric is a woven fabric. In another embodiment, the fabric is a non-woven fabric. In some embodiments, the fabric includes polyester. In some embodiments, the fabric includes a stich-bonded polyester. In another embodiment, the fabric includes a glass fabric.

Figure 5:
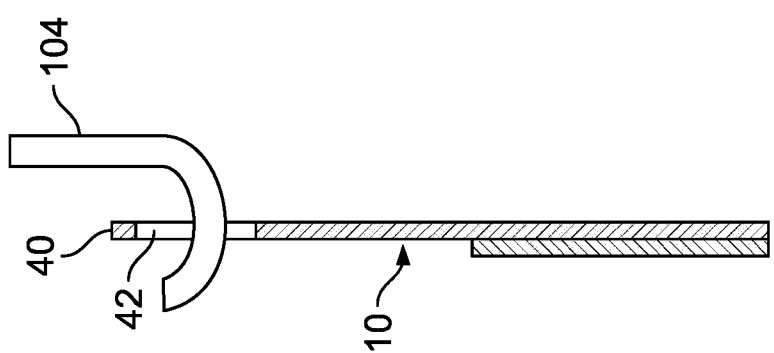
FIG. 5 is a cross-sectional view, taken along lines 5-5 and looking in the direction of the arrows, of the roofing shingle shown in FIG. 1A.

Referring to FIG. 5, in some embodiments, the cutout 42 is sized and shaped to receive an external object to facilitate holding the handle 40 by a user and carrying the shingle 10. In some embodiments, the external object includes a hand of the user. In another embodiment, the external object includes a carrying tool. In another embodiment, the external object includes a hook 104.

Figure 6:
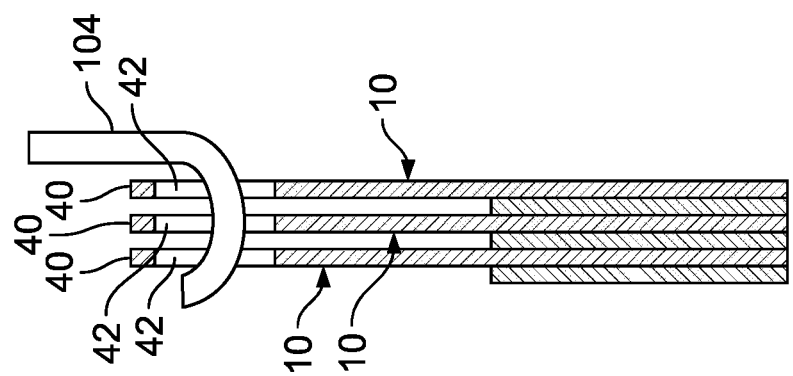
FIG. 6 is a cross-sectional view of a plurality of the roofing shingles shown in FIG. 5, the shingles being grouped together and engaged by a carrying hook.

Referring to FIG. 6, in some embodiments, a plurality of the shingles 10 may be stacked or bundled together. In some embodiments, each of the handles 40 and, specifically, each of the cutouts 42, of each of the shingles 10 substantially aligns with one another. In embodiment, aligned ones of the cutouts 42 are configured to receive the user's hand or other external object, such as a carrying tool or the hook 104, to facilitate holding and transporting a plurality of the shingles 10 simultaneously.

Figure 7:
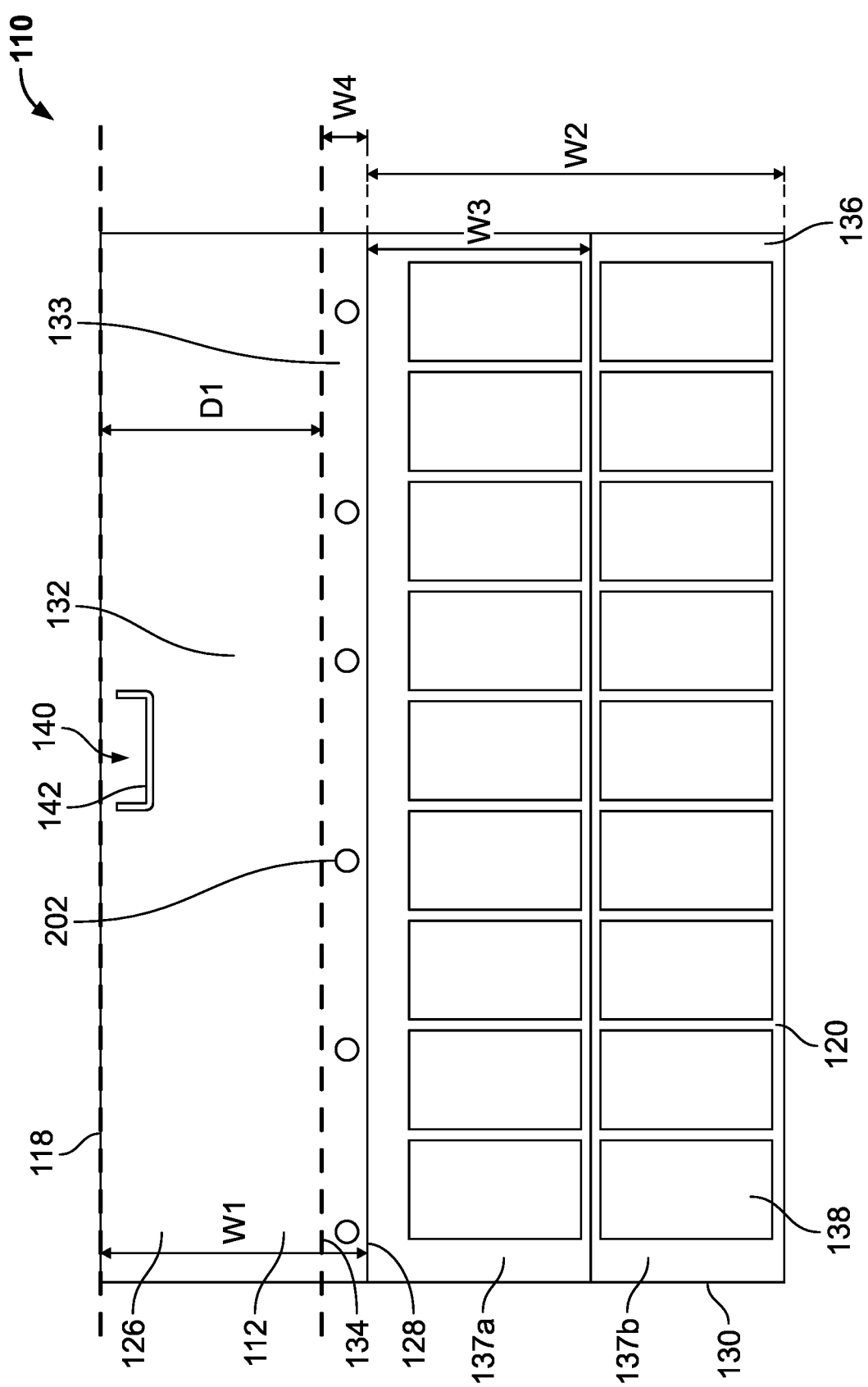
FIG. 7 is a top elevational view of an embodiment of a roofing shingle.

FIG. 7 illustrates an embodiment of a shingle 110. The shingle 110 includes a structure and function similar to the shingle 10 except as otherwise shown and noted. In some embodiments, the shingle 110 includes a first layer 112 having a head lap 126 and a reveal portion 130. In some embodiments, the reveal portion 130 includes a second layer 136 overlaying the first layer 112. In some embodiments, the second layer 136 includes a plurality of rows 137a, 137b of at least one solar cell 138. In some embodiments, the at least one solar cell 138 includes a plurality of solar cells. In some embodiments, the plurality of rows 137a, 137b of the at least one solar cell 138 are aligned with one another.

In some embodiments, the head lap 126 includes a first width W1 and the reveal portion includes a second width W2. In some embodiments, the second width W2 is greater than the first width W1. In some embodiments, the first width W1 extends from the first edge 18 to a first location 128. In some embodiments, the second width W2 extends from the second edge 120 to the first location 128. In some embodiments, each of the rows 137a, 137b of the at least one solar cell 138 includes a third width W3.

In some embodiments, the head lap 126 includes a first area 132 extending from the first edge 118 to a second location 134 intermediate the first edge 118 and the second edge 120. In some embodiments, the head lap 126 includes a second area 133 extending from the first location 128 to the second location 134. In some embodiments, the second area 133 includes a fourth width W4. In some embodiments, the second area 133 is configured to receive a plurality of fasteners 202. In some embodiments, the first area 132 extends a distance D1 approximately equal to the difference between the first width W1 and the fourth width W4.

In some embodiments, the first width W1 is 6 inches to 40 inches. In another embodiment, the first width W1 is 6 inches to 35 inches. In another embodiment, the first width W1 is 6 inches to 30 inches. In another embodiment, the first width W1 is 6 inches to 25 inches. In another embodiment, the first width W1 is 6 inches to 20 inches. In another embodiment, the first width W1 is 6 inches to 15 inches. In another embodiment, the first width W1 is 6 inches to 10 inches.

In some embodiments, the first width W1 is 10 inches to 40 inches. In another embodiment, the first width W1 is 10 inches to 35 inches. In another embodiment, the first width W1 is 10 inches to 30 inches. In another embodiment, the first width W1 is 10 inches to 25 inches. In another embodiment, the first width W1 is 10 inches to 20 inches. In another embodiment, the first width W1 is 10 inches to 15 inches.

In some embodiments, the first width W1 is 15 inches to 40 inches. In another embodiment, the first width W1 is 15 inches to 35 inches. In another embodiment, the first width W1 is 15 inches to 30 inches. In another embodiment, the first width W1 is 15 inches to 25 inches. In another embodiment, the first width W1 is 15 inches to 20 inches.

In some embodiments, the first width W1 is 20 inches to 40 inches. In another embodiment, the first width W1 is 20 inches to 35 inches. In another embodiment, the first width W1 is 20 inches to 30 inches. In another embodiment, the first width W1 is 20 inches to 25 inches.

In some embodiments, the first width W1 is 25 inches to 40 inches. In another embodiment, the first width W1 is 25 inches to 35 inches. In another embodiment, the first width W1 is 25 inches to 30 inches. In some embodiments, the first width W1 is 30 inches to 40 inches. In another embodiment, the first width W1 is 30 inches to 35 inches. In some embodiments, the first width W1 is 35 inches to 40 inches.

In some embodiments, the first width W1 is 6 inches. In some embodiments, the first width W1 is 10 inches. In some embodiments, the first width W1 is 15 inches. In some embodiments, the first width W1 is 20 inches. In some embodiments, the first width W1 is 25 inches. In some embodiments, the first width W1 is 30 inches. In some embodiments, the first width W1 is 35 inches. In some embodiments, the first width W1 is 40 inches.

In some embodiments, the second width W2 is 5 inches to 18 inches. In another embodiment, the second width W2 is 5 inches to 17 inches. In another embodiment, the second width W2 is 5 inches to 16 inches. In another embodiment, the second width W2 is 5 inches to 15 inches. In another embodiment, the second width W2 is 5 inches to 14 inches. In another embodiment, the second width W2 is 5 inches to 13 inches. In another embodiment, the second width W2 is 5 inches to 12 inches. In another embodiment, the second width W2 is 5 inches to 11 inches. In another embodiment, the second width W2 is 5 inches to 10 inches. In another embodiment, the second width W2 is 5 inches to 9 inches. In another embodiment, the second width W2 is 5 inches to 8 inches. In another embodiment, the second width W2 is 5 inches to 7 inches. In another embodiment, the second width W2 is 5 inches to 6 inches.

In some embodiments, the second width W2 is 6 inches to 18 inches. In another embodiment, the second width W2 is 6 inches to 17 inches. In another embodiment, the second width W2 is 6 inches to 16 inches. In another embodiment, the second width W2 is 6 inches to 15 inches. In another embodiment, the second width W2 is 6 inches to 14 inches. In another embodiment, the second width W2 is 6 inches to 13 inches. In another embodiment, the second width W2 is 6 inches to 12 inches. In another embodiment, the second width W2 is 6 inches to 11 inches. In another embodiment, the second width W2 is 6 inches to 10 inches. In another embodiment, the second width W2 is 6 inches to 9 inches. In another embodiment, the second width W2 is 6 inches to 8 inches. In another embodiment, the second width W2 is 6 inches to 7 inches.

In some embodiments, the second width W2 is 7 inches to 18 inches. In another embodiment, the second width W2 is 7 inches to 17 inches. In another embodiment, the second width W2 is 7 inches to 16 inches. In another embodiment, the second width W2 is 7 inches to 15 inches. In another embodiment, the second width W2 is 7 inches to 14 inches. In another embodiment, the second width W2 is 7 inches to 13 inches. In another embodiment, the second width W2 is 7 inches to 12 inches. In another embodiment, the second width W2 is 7 inches to 11 inches. In another embodiment, the second width W2 is 7 inches to 10 inches. In another embodiment, the second width W2 is 7 inches to 9 inches. In another embodiment, the second width W2 is 7 inches to 8 inches.

In some embodiments, the second width W2 is 8 inches to 18 inches. In another embodiment, the second width W2 is 8 inches to 17 inches. In another embodiment, the second width W2 is 8 inches to 16 inches. In another embodiment, the second width W2 is 8 inches to 15 inches. In another embodiment, the second width W2 is 8 inches to 14 inches. In another embodiment, the second width W2 is 8 inches to 13 inches. In another embodiment, the second width W2 is 8 inches to 12 inches. In another embodiment, the second width W2 is 8 inches to 11 inches. In another embodiment, the second width W2 is 8 inches to 10 inches. In another embodiment, the second width W2 is 8 inches to 9 inches.

In some embodiments, the second width W2 is 9 inches to 18 inches. In another embodiment, the second width W2 is 9 inches to 17 inches. In another embodiment, the second width W2 is 9 inches to 16 inches. In another embodiment, the second width W2 is 9 inches to 15 inches. In another embodiment, the second width W2 is 9 inches to 14 inches. In another embodiment, the second width W2 is 9 inches to 13 inches. In another embodiment, the second width W2 is 9 inches to 12 inches. In another embodiment, the second width W2 is 9 inches to 11 inches. In another embodiment, the second width W2 is 9 inches to 10 inches.

In some embodiments, the second width W2 is 10 inches to 18 inches. In another embodiment, the second width W2 is 10 inches to 17 inches. In another embodiment, the second width W2 is 10 inches to 16 inches. In another embodiment, the second width W2 is 10 inches to 15 inches. In another embodiment, the second width W2 is 10 inches to 14 inches. In another embodiment, the second width W2 is 10 inches to 13 inches. In another embodiment, the second width W2 is 10 inches to 12 inches. In another embodiment, the second width W2 is 10 inches to 11 inches.

In some embodiments, the second width W2 is 11 inches to 18 inches. In another embodiment, the second width W2 is 11 inches to 17 inches. In another embodiment, the second width W2 is 11 inches to 16 inches. In another embodiment, the second width W2 is 11 inches to 15 inches. In another embodiment, the second width W2 is 11 inches to 14 inches. In another embodiment, the second width W2 is 11 inches to 13 inches. In another embodiment, the second width W2 is 11 inches to 12 inches.

In some embodiments, the second width W2 is 12 inches to 18 inches. In another embodiment, the second width W2 is 12 inches to 17 inches. In another embodiment, the second width W2 is 12 inches to 16 inches. In another embodiment, the second width W2 is 12 inches to 15 inches. In another embodiment, the second width W2 is 12 inches to 14 inches. In another embodiment, the second width W2 is 12 inches to 13 inches.

In some embodiments, the second width W2 is 13 inches to 18 inches. In another embodiment, the second width W2 is 13 inches to 17 inches. In another embodiment, the second width W2 is 13 inches to 16 inches. In another embodiment, the second width W2 is 13 inches to 15 inches. In another embodiment, the second width W2 is 13 inches to 14 inches. In some embodiments, the second width W2 is 14 inches to 18 inches. In another embodiment, the second width W2 is 14 inches to 17 inches. In another embodiment, the second width W2 is 14 inches to 16 inches. In another embodiment, the second width W2 is 14 inches to 15 inches. In some embodiments, the second width W2 is 15 inches to 18 inches. In another embodiment, the second width W2 is 15 inches to 17 inches. In another embodiment, the second width W2 is 15 inches to 16 inches. In some embodiments, the second width W2 is 16 inches to 18 inches. In another embodiment, the second width W2 is 16 inches to 17 inches. In some embodiments, the second width W2 is 17 inches to 18 inches.

In some embodiments, the second width W2 is 5 inches. In some embodiments, the second width W2 is 6 inches. In some embodiments, the second width W2 is 7 inches. In some embodiments, the second width W2 is 8 inches. In some embodiments, the second width W2 is 9 inches. In some embodiments, the second width W2 is 10 inches. In some embodiments, the second width W2 is 11 inches. In some embodiments, the second width W2 is 12 inches. In some embodiments, the second width W2 is 13 inches. In some embodiments, the second width W2 is 14 inches. In some embodiments, the second width W2 is 15 inches. In some embodiments, the second width W2 is 16 inches. In some embodiments, the second width W2 is 17 inches. In some embodiments, the second width W2 is 18 inches.

In some embodiments, the third width W3 is 6 inches to 40 inches. In another embodiment, the third width W3 is 6 inches to 35 inches. In another embodiment, the third width W3 is 6 inches to 30 inches. In another embodiment, the third width W3 is 6 inches to 25 inches. In another embodiment, the third width W3 is 6 inches to 20 inches. In another embodiment, the third width W3 is 6 inches to 15 inches. In another embodiment, the third width W3 is 6 inches to 10 inches.

In some embodiments, the third width W3 is 10 inches to 40 inches. In another embodiment, the third width W3 is 10 inches to 35 inches. In another embodiment, the third width W3 is 10 inches to 30 inches. In another embodiment, the third width W3 is 10 inches to 25 inches. In another embodiment, the third width W3 is 10 inches to 20 inches. In another embodiment, the third width W3 is 10 inches to 15 inches.

In some embodiments, the third width W3 is 15 inches to 40 inches. In another embodiment, the third width W3 is 15 inches to 35 inches. In another embodiment, the third width W3 is 15 inches to 30 inches. In another embodiment, the third width W3 is 15 inches to 25 inches. In another embodiment, the third width W3 is 15 inches to 20 inches.

In some embodiments, the third width W3 is 20 inches to 40 inches. In another embodiment, the third width W3 is 20 inches to 35 inches. In another embodiment, the third width W3 is 20 inches to 30 inches. In another embodiment, the third width W3 is 20 inches to 25 inches.

In some embodiments, the third width W3 is 25 inches to 40 inches. In another embodiment, the third width W3 is 25 inches to 35 inches. In another embodiment, the third width W3 is 25 inches to 30 inches. In some embodiments, the third width W3 is 30 inches to 40 inches. In another embodiment, the third width W3 is 30 inches to 35 inches. In some embodiments, the third width W3 is 35 inches to 40 inches.

In some embodiments, the third width W3 is 6 inches. In some embodiments, the third width W3 is 10 inches. In some embodiments, the third width W3 is 15 inches. In some embodiments, the third width W3 is 20 inches. In some embodiments, the third width W3 is 25 inches. In some embodiments, the third width W3 is 30 inches. In some embodiments, the third width W3 is 35 inches. In some embodiments, the third width W3 is 40 inches.

In some embodiments, the fourth width W4 is 0.5 inch to 3 inches. In another embodiment, the fourth width W4 is 0.5 inch to 2.5 inches. In another embodiment, the fourth width W4 is 0.5 inch to 2 inches. In another embodiment, the fourth width W4 is 0.5 inch to 1.5 inches. In another embodiment, the fourth width W4 is 0.5 inch to 1 inch. In some embodiments, the fourth width W4 is 1 inch to 3 inches. In another embodiment, the fourth width W4 is 1 inch to 2.5 inches. In another embodiment, the fourth width W4 is 1 inch to 2 inches. In another embodiment, the fourth width W4 is 1 inch to 1.5 inch. In some embodiments, the fourth width W4 is 1.5 inches to 3 inches. In another embodiment, the fourth width W4 is 1.5 inches to 2.5 inches. In another embodiment, the fourth width W4 is 1.5 inches to 2 inches. In some embodiments, the fourth width W4 is 2 inches to 3 inches. In another embodiment, the fourth width W4 is 2 inches to 2.5 inches. In some embodiments, the fourth width W4 is 2.5 inches to 3 inches.

In some embodiments, the cutout 42 includes a fourth width W4 of 0.5 inch. In some embodiments, the cutout 42 includes a fourth width W4 of 1 inch. In some embodiments, the cutout 42 includes a fourth width W4 of 1.5 inches. In some embodiments, the cutout 42 includes a fourth width W4 of 2 inches. In some embodiments, the cutout 42 includes a fourth width W4 of 2.5 inches. In some embodiments, the cutout 42 includes a fourth width W4 of 3 inches. In some embodiments, the head lap 126 includes at least one handle 140. In some embodiments, the at least one handle 140 includes a cutout 142. In some embodiments, the at least one handle 140 is located within the first area 132.

FIGS. 8A through 8C illustrate embodiments of shingles 160A, 160B and 160C showing different sizes and shapes of a handle 140. The shingles 160A, 160B, 160C include a structure and function similar to the shingles 10, 110 except each of the shingles 160A, 160B, 160C include a first side lap 162 located at a first end thereof and a second side lap 164 located at a second end thereof. In some embodiments, the reveal portion 130 of one of the shingles 160A, 160B, 160C overlays the head lap 126 of another of the shingles 160A, 160B, 160C, respectively. In some embodiments, the first side lap 162 of the one of the shingles 160A, 160B, 160C is aligned or substantially aligned with the first side lap 162 of the another of the shingles 160A, 160B, 160C, respectively. In some embodiments, the second side lap 164 of the one of the shingles 160A, 160B, 160C is aligned or substantially aligned with the second side lap 164 of the another of the shingles 160A, 160B, 160C, respectively.

FIGS. 9A and 9B illustrate an embodiment of a shingle 210. The shingle 210 includes a structure and function similar to the shingles 10, 110 except as otherwise shown and noted. In some embodiments, the shingle 210 includes a first layer 212 having a head lap 226 and a reveal portion 230. In some embodiments, the head lap 226 includes a first surface 227 and a second surface 229 opposite the first surface 227. In some embodiments, the reveal portion 230 includes a second layer 236 overlaying the first layer 212. In some embodiments, the second layer 236 at least one solar cell 238. In some embodiments, the at least one solar cell 238 includes a plurality of solar cells.

In some embodiments, the shingle 210 includes at least one handle 240 attached to the head lap 226. In some embodiments, the at least one handle 240 includes a plurality of the handles 240. In some embodiments, the at least one handle 240 may be attached at any location on the head lap 226. In some embodiments, the at least one handle 240 is attached to the first surface 227 of the head lap 226. In some embodiments, the at least one handle 240 is attached to the second surface 229 of the head lap 226. In some embodiments, the at least one handle 240 is positioned intermediate a first end 214 and a second end 216 of the shingle 210. In some embodiments, the at least one handle 240 is positioned proximate to the first end 214. In some embodiments, the at least one handle 240 is positioned proximate to the second end 216. In some embodiments, the at least one handle 240 is positioned approximately midway between the first end 214 and the second end 216 of the shingle 210. In some embodiments, the at least one handle 240 is positioned intermediate a first edge 218 and a second edge 220 of the shingle 210. In some embodiments, the at least one handle 240 is positioned proximate to the first edge 218. In some embodiments, the at least one handle 240 is positioned proximate to a first location 228 intermediate the first edge 218 and the second edge 220.

In some embodiments, the at least one handle 240 is composed of a polymer. In some embodiments, the at least one handle 240 includes thermoplastic polyolefin (TPO). In other embodiments, the at least one handle 240 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the at least one handle 240 is ultrasonically welded to the head lap 226. In some embodiments, the at least one handle 240 is heat welded to the head lap 226. In some embodiments, the at least one handle 240 is thermally bonded to the head lap 226. In some embodiments, the at least one handle 240 is attached to the head lap 226 by an adhesive. In another embodiment, the at least one handle 240 is attached removably to the head lap 226.

In some embodiments, the at least one handle 240 includes a gripping portion 243 and a pair of legs 245 extending from the gripping portion 243 and attached to the head lap 226. In some embodiments, the gripping portion 243 is linear in shape. In some embodiments, the gripping portion 243 is curvilinear in shape. In another embodiment, the pair of legs 245 need not be included and the gripping portion 243 is attached to the head lap 226. In embodiment, the at least one handle 240 is configured to receive a user's hand or other external object, such as a carrying tool or the hook 104, to facilitate holding and transporting the shingle 210.

In some embodiments, the at least one handle 240 is moveable between a retracted position, in which the gripping portion 243 is juxtaposed with or substantially juxtaposed with the head lap 226, and an extended position, in which the gripping portion 243 extends outwardly and obliquely from the head lap 226. In some embodiments, the at least one handle 240 extends zero (0) degrees to 90 degrees relative to the head lap 226.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A roofing shingle, comprising:
    a first layer having:
        a first end, a second end opposite the first end, a first edge extending from the first end to the second end, and a second edge opposite the first edge and extending from the first end to the second end,
        a first portion extending from the first end to the second end adjacent the first edge of the first layer, and
        a second portion extending from the first end to the second end adjacent the second edge of the first layer, and
    a second layer,
        wherein the second layer is positioned above the first layer,
        wherein the first portion includes at least one handle located between the first end and the second end and proximate to the first edge,
        wherein the first layer forms a continuous flat surface between the at least one handle and the second edge,
        wherein the at least one handle includes at least one cutout.

2. The roofing shingle of claim 1, wherein the at least one cutout extends from a top surface of the roofing shingle, through the first and second layers, to a bottom surface of the roofing shingle.

3. The roofing shingle of claim 2, wherein the at least one cutout includes a flap.

4. The roofing shingle of claim 3, wherein the flap is configured to move between at least a first position and a second position.

5. The roofing shingle of claim 1, wherein the at least one cutout includes a shape selected from the group consisting of a rectangle, a square, a rounded rectangle, an ellipse, a circle, a triangle, and a polygon.

6. The roofing shingle of claim 1, wherein the at least one cutout includes a plurality of cutouts.

7. The roofing shingle of claim 1, wherein a portion of the at least one handle is moveable between a retracted position and an extended position.

8. A system comprising:
a roof deck,
a plurality of roofing shingles located above the roof deck,
wherein each roofing shingle of the plurality of roofing shingles comprising:
a first layer having:
a first end, a second end opposite the first end, a first edge extending from the first end to the second end, and a second edge opposite the first edge and extending from the first end to the second end,
a first portion extending from the first end to the second end adjacent the first edge of the first layer, and
a second portion extending from the first end to the second end adjacent the second edge of the first layer, and
a second layer,
wherein the second layer is positioned above the first layer,
wherein the first portion includes at least one handle located between the first end and the second end and proximate to the first edge,
wherein the first layer forms a continuous flat surface between the at least one handle and the second edge, and
wherein the at least one handle includes at least one cutout, and
wherein at least one of the plurality of roofing shingles comprises a solar shingle.

9. The system of claim 8, wherein each cutout of the at least one cutout extends through the first and second layers.

10. The system of claim 8, wherein each cutout of the at least one cutout includes a flap.

11. The system of claim 10, wherein each flap is configured to move between at least a first position and a second position.

12. The system of claim 8, wherein each cutout of the at least one cutout includes a shape selected from the group consisting of a rectangle, a square, a rounded rectangle, an ellipse, a circle, a triangle, and a polygon.

13. The system of claim 8, wherein each cutout of the at least one cutout includes a plurality of cutouts.

14. The system of claim 8, wherein a portion of each handle of the at least one handle is moveable between a retracted position and an extended position.

15. The system of claim 8, wherein the solar shingle further comprises:
at least one solar cell located above the second portion of the first layer.

16. A method comprising:
obtaining a plurality of roofing shingles,
wherein each roofing shingle of the plurality of roofing shingles comprising:
a first layer having:
a first end, a second end opposite the first end, a first edge extending from the first end to the second end, and a second edge opposite the first edge and extending from the first end to the second end,
a first portion extending from the first end to the second end adjacent the first edge of the first layer, and
a second portion extending from the first end to the second end adjacent the second edge of the first layer, and
a second layer,
wherein the second layer is positioned above the first layer,
wherein the first portion includes at least one handle located between the first end and the second end and proximate to the first edge,
wherein the first layer forms a continuous flat surface between the at least one handle and the second edge, and
wherein the at least one handle includes at least one cutout, and
wherein at least one of the plurality of roofing shingles comprises a solar shingle, and
attaching each of the plurality of roofing shingles to a roof deck.

17. The method of claim 16, wherein each cutout of the at least one cutout extends through the first and second layers.

18. The method of claim 17, wherein each cutout of the at least one cutout includes a shape selected from the group consisting of a rectangle, a square, a rounded rectangle, an ellipse, a circle, a triangle, and a polygon.

19. The method of claim 17, wherein the solar shingle further comprises:
at least one solar cell located above the second portion of the first layer.

20. The method of claim 17, wherein each cutout of the at least one cutout includes a flap movable between at least two positions.

* * * * *